Feb. 1, 1955 W. E. SARGEANT ET AL 2,701,335
ELECTRICAL PICKUP
Filed Nov. 21, 1950
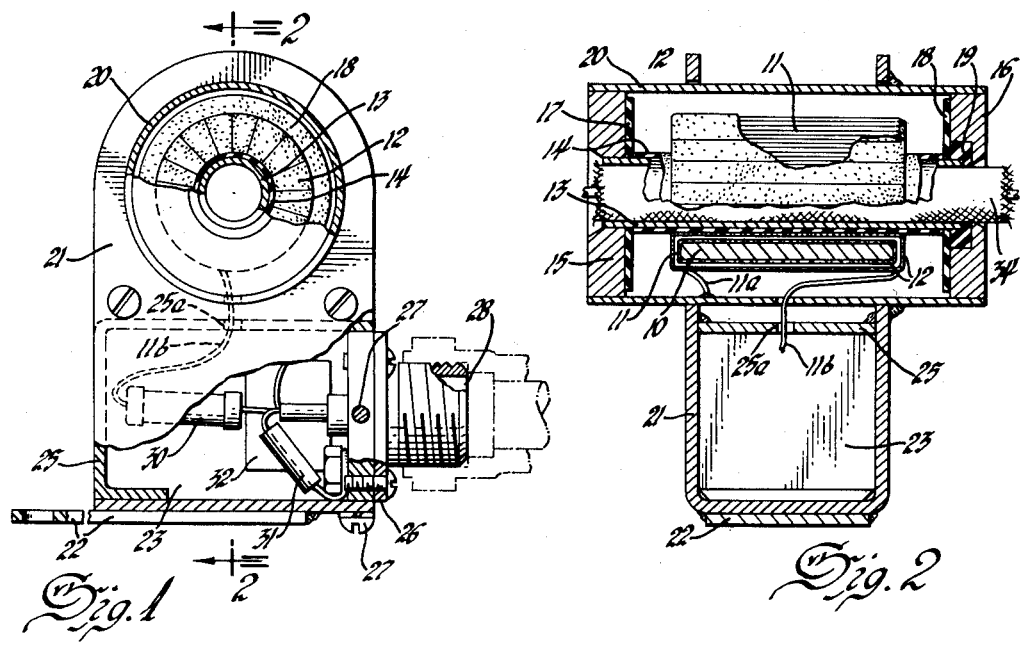
Fig. 1
Fig. 2
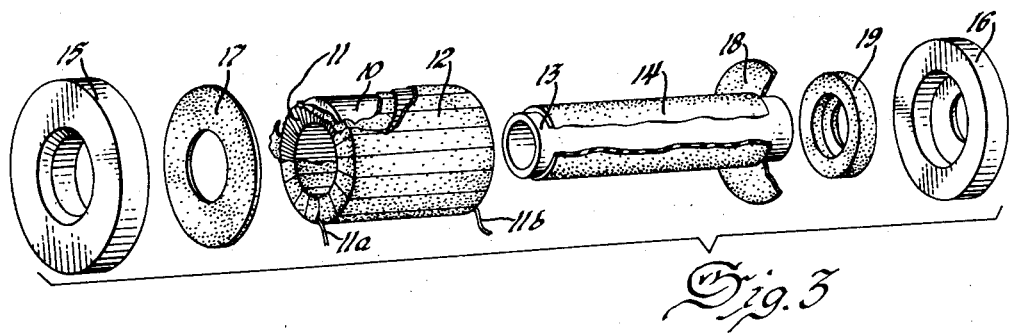
Fig. 3
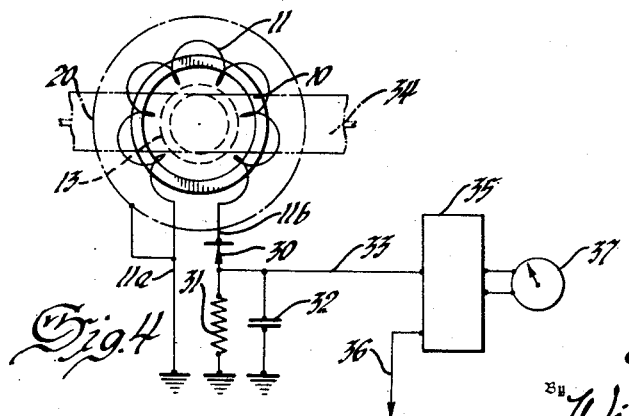
Fig. 4
Inventors
Walter E. Sargeant, &
Edward F. Wellet, Jr.
By Willits, Helwig & Baillio
Attorneys.

United States Patent Office 2,701,335
Patented Feb. 1, 1955

2,701,335

ELECTRICAL PICKUP

Walter E. Sargeant, Huntington Woods, and Edward F. Weller, Jr., Detroit, Mich., assignors to General Motors Corporation, Detroit, Mich., a corporation of Delaware Application November 21, 1950, Serial No. 196,882

5 Claims. (Cl. 324—16)

This invention relates to an electrical pickup, and more particularly to an electromagnetic type of pickup especially designed for providing indications of spark impulses.

One feature of the invention is that it provides an improved electrical pickup; another feature of the invention is that it provides a pickup having a toroidal winding adapted to receive a current carrying member, as a high tension ignition cable, in its central aperture; a further feature of the invention is that it provides means for electrostatically shielding the winding from the current carrying member; still another feature of the invention is that rectifying means are provided for rectifying voltage impulses induced in the toroidal winding; yet a further feature of the invention is that the rectified voltage impulses are developed in the pickup across impedance means comprising a resistor and a condenser connected in parallel; yet another feature of the invention is that it provides a spark pickup which may readily be mounted on a high tension ignition cable in the engine under test, and which provides impulses which are accurately indicative of the spark occurrence; and still a further feature of the invention is that the pickup does not adversely affect the operation of the ignition system of the engine under test.

Other features and advantages of the invention will be apparent from the following description, and from the drawings in which:

Figure 1 is an end elevational view, partly in section, of the improved pickup device; Figure 2 is a longitudinal section taken along the line 2—2 of Figure 1; Figure 3 is an exploded view of the core and winding assembly of the device; and Figure 4 is a schematic diagram of the pickup and associated circuits.

In testing an engine, such as an automobile engine, it is often necessary to provide an indication of the spark impulses from one cylinder or from a plurality of cylinders of the engine in order to test the operation of the spark plugs, the spark advance angle, or other operating characteristics of the engine. In testing to determine the amount of spark advance it is common practice to utilize an electronic switching device which is triggered both by the spark impulses and by some other impulses of known relation to the operating cycle of the engine to provide an indication of the amount of spark advance. In one testing device of this type an impulse indicative of the spark from one of the cylinders is provided to trigger an electronic circuit and render the circuit conductive, and another impulse indicative of top dead center position of the piston in the cylinder is provided subsequently to trigger the electric circuit and render it non-conductive. The proportion of the total time in the cycle when current flows is indicative of the spark advance angle, and this time may be determined by reading the average current flow through a meter which preferably is calibrated to give a direct reading in degrees of spark advance.

Certain types of indicating apparatus of this nature are fully disclosed in the patent to J. R. MacGregor et al., which issued January 7, 1941, as Patent No. 2,228,032, and in the patent to K. R. Eldrege which issued November 25, 1941, as Patent No. 2,263,859. Reference may be had, if desired, to these patents for a full disclosure of electronic indicating means which may be utilized with the pickup of this invention.

In providing voltage impulses indicative of the spark occurrence in the engine cylinders, difficulties have been encountered in providing an accurate indication which is truly representative of the occurrence of the spark, and in providing such an indication without adversely affecting the operation of the ignition system of the engine. Capacitive type pickups have been utilized to provide the spark impulses, but it has been found that pickups of this type which introduce an additional gap in series with the spark plug gap often adversely affect the operation of the engine, particularly when the high voltage impulses which cause the spark are relatively low, in which case the spark often fails due to the added gap and the engine misfires. Other capacitive type pickups have been developed which do not add a gap in series with the spark plug gap, but these pickups have been found to be unreliable, particularly when the high voltage impulses which cause the spark are relatively high. Under such conditions the impulse developed by the pickup will often precede the actual spark occurrence in the engine so that the impulse is not accurate and is not truly representative of the instant of the spark occurrence. Other pickups have been developed which may be directly connected to the breaker points of the ignition system. Such pickups are not suitable for single cylinder operation and will not eliminate any errors introduced into the spark timing by faulty breaker points.

The present invention provides an improved electromagnetic type pickup which operates as a current transformer having its secondary electrostatically shielded from the primary which may comprise a high tension lead to which the secondary in the pickup is electromagnetically coupled, so that there is no capacitive effect to deleteriously affect the ignition system. The pickup is actuated by the current pulse which causes the spark so that it gives a truly accurately timed indication of the spark occurrence, and the pickup is so designed that it may be readily mounted in association with one of the high tension cables either near the spark coil or near one of the spark plugs, depending upon whether indications are desired of the spark in each cylinder or of the spark in only a single cylinder.

Referring now more particularly to the drawings, the pickup includes a permeable core 10 of toroidal form which may be formed of laminated or powdered iron and upon which is disposed a toroidal winding 11 preferably comprising from 100 to 200 turns of wire, the main portion of which extends generally parallel to the axis of the bore or central aperture through the core. Preferably the core 10 is provided with an insulating layer which may be formed by winding adhesive tape strips parallel to the axis of the core to cover the entire surface of the core, including the surface of the bore. After the winding 11 is mounted on the insulated core another layer of adhesive tape may be provided as indicated at 12.

The core is mounted on a brass sleeve 13 carried in the bore of an insulating sleeve 14 which may be formed of Bakelite. Centrally apertured brass end plates 15 and 16 are secured at the ends of the assembly, insulating washers 17 and 18 being mounted on the sleeve 13 and a Bakelite insulator 19 being inserted in a cup shaped recess in the end plate 16 as shown in Figures 2 and 3. The entire assembly is housed in a brass shell 20. While the sleeve 13, end plates 15 and 16 and shell 20 are preferably formed of brass as specified herein, any electrically conducting, non-magnetic material would be suitable, since the electrical conductive characteristics of the sleeve 13, end plates 15 and 16 and shell 20 provide means for electrostatically shielding the winding 11 from a current carrying member which is inserted through the bore of the sleeve 13 when the pickup is mounted for operation, as shown diagrammatically in Figure 4. At the same time the non-magnetic characteristics of the shielding members permit electromagnetic coupling between the winding 11 and the current carrying member.

The electrostatically shielded core and winding assembly is mounted in openings in the arms of a U-shaped housing 21 which is secured, as by welding, to a support bracket 22. The bracket 22 may be mounted on the fire wall in the engine compartment of an automobile in such manner that the high tension lead from the ignition coil may extend through the bore of the sleeve 13 of the pickup.

The bottom portion of the U-shaped housing 21 is closed to provide a compartment 23 for electrical circuit elements comprising part of the pickup. An L-shaped shield member 25 extends across the space between the legs of the U-shaped housing and also closes one side of the above mentioned compartment. An aperture 25a is provided in the shield member through which one end of the winding 11 may extend. The other side of the compartment 23 is closed by a mounting plate 26, which is secured as shown at 27 in Figure 1 by means of studs to the arms of the housing 21. A coaxial output jack member 28 is bolted to the mounting plate 26, said plate having a central output opening in alignment with said jack to admit a conductor for utilizing voltages developed by the pickup unit.

Referring more particularly to Figure 4, one end 11a of the winding 11 is grounded, as by making connection with the metallic shell 20, and the other end 11b of the winding is connected to one side of a rectifier 30 which preferably is a crystal rectifier. Impedance means are connected between the other side of the rectifier and ground, this impedance means comprising a resistor 31 which may have a value of 50,000 ohms and a condenser 32 which may have a value of 30 micromicrofarads. The crystal 30, resistor 31 and condenser 32 are housed in the compartment 23 formed in the housing 21, as shown in Figure 1, and the condenser and resistor are grounded at one side by making connection with the metallic shell of the compartment. A conductor 33 extends through the coaxial jack 28 and is connected to the impedance means between the RC network and the crystal 30 for utilizing voltages developed across the impedance network.

As earlier pointed out, a high tension lead, which may be the ignition cable 34 from the ignition coil of the engine under test, extends through the central aperture of the toroidal winding assembly, the bore of the sleeve 13 preferably being of such diameter that it readily admits the ignition cable to provide an electromagnetic current transformer type of coupling, the lead 34 acting as the primary and the winding 11 acting as the secondary. The electrostatic shield in which the winding 11 is encased isolates the winding from the ignition cable 34 insofar as deleterious capacitive effects are concerned. However, inasmuch as the electromagnetic shield is formed of non-magnetic material, it has no effect on the electromagnetic coupling between the high tension cable 34 and the winding 11.

The output conductor 33 is connected to indicating apparatus 35 which may comprise an electronic switch generally of the type described in the Eldrege and MacGregor et al. patents above referred to. Other triggering impulses are applied to the indicating apparatus through a conductor 36 which may extend from another pickup device, as for example, a pickup associated with the flywheel of the vehicle. This flywheel pickup is so arranged that it develops impulses indicative of top dead center position of the engine pistons, or of some other predetermined position in a cycle of operation of the engine. The power output of the indicating apparatus 35 may be read on a meter 37 in a manner similar to that disclosed in the Eldredge and MacGregor, et al. patents above referred to.

The pickup above described, in cooperation with the high tension lead with which it is associated, forms a current transformer which develops an impulse accurately indicative of the spark occurrence. There is no deleterious capacitive coupling between the pickup and the high tension lead and the impulse developed by the pickup is a direct function of the current pulse at the time the spark occurs. The provision of the rectifier 30 eliminates the necessity of a well matched transmission line, because the pulse from the pickup is a direct current pulse. Because the winding assembly is toroidal in shape it is insensitive to all electromagnetic fields except those developed by currents flowing in the cable which extends through the central aperture. In the event interference occurs because of standing waves on the connecting cable, a modification may be made by center-tapping the toroidal coil and feeding a voltage output into a balanced line, using two wires and a grounded sheath.

While we have shown and described one embodiment of our invention, it is subject to many modifications. Changes, therefore, in the construction and arrangement may be made without departing from the spirit and scope of the invention as set forth in the appended claims.

We claim:

1. A spark pickup of the character described, comprising: a permeable core of toroidal form adapted to receive a high voltage ignition cable in its central aperture; a toroidal winding on said core, the major portion of the wire in said winding extending generally parallel to said cable, and said winding having one end grounded; means for electrostatically shielding said winding from said cable, comprising an electrically conductive, non-magnetic sleeve in said central aperture and an electrically conductive, non-magnetic shell encasing said core and winding; rectifying means having one side connected to the other end of said winding; impedance means comprising a resistor and a condenser connected in parallel between the other side of said rectifying means and ground; a metallic housing for said core, winding, rectifying means and impedance means; and a conductor connector to said impedance means for utilizing voltages developed thereacross.

2. Apparatus of the character claimed in claim 1, wherein said winding comprises from 100 to 200 turns of wire, and wherein said rectifying means comprises a crystal rectifier.

3. A spark pickup of the character described, including: a current transformer comprising a permeable core of toroidal form adapted to receive a high voltage ignition cable in its central aperture; a toroidal winding on said core, the major portion of the wire in said winding extending generally parallel to said cable; and means for electrostatically shielding said winding from said cable, comprising an electrically conductive, non-magnetic sleeve in said central aperture and an electrically conductive, non-magnetic shell completely surrounding and substantially encasing said core and winding.

4. A spark pickup of the character described, including: a toroidal winding having a central aperture adapted to receive a high voltage ignition cable, the major portion of the wire in said winding extending generally parallel to said cable; means for electrostatically shielding said winding from said cable, comprising an electrically conductive, non-magnetic sleeve in said central aperture and an electrically conductive non-magnetic shell completely surrounding and substantially encasing said winding; and an insulating member located between one end of said sleeve and the inner surface of the adjacent end portion of said shell.

5. A spark pickup of the character described, comprising: a permeable core of toroidal form adapted to receive a high voltage cable in its central aperture; a toroidal winding on said core, the major portion of the wire in said winding extending generally parallel to said cable and said winding having one end grounded; means for electrostatically shielding said winding from said cable, comprising an electrically conductive, non-magnetic sleeve in said central aperture and an electrically conductive, non-magnetic shell completely surrounding and substantially encasing said winding; rectifying means having one side connected to the ungrounded end of said winding; impedance means connected between the other side of said rectifying means and ground; and a conductor connected to said impedance means for utilizing voltages developed thereacross.

References Cited in the file of this patent

UNITED STATES PATENTS

| | | |
|---|---|---|
| 2,134,589 | Stanek | Oct. 25, 1938 |
| 2,214,915 | Wehrlin | Sept. 17, 1940 |
| 2,327,774 | Dickinson | Aug. 24, 1943 |
| 2,335,612 | Reiskind | Nov. 30, 1943 |
| 2,378,928 | Johnson et al. | June 26, 1945 |
| 2,418,114 | Frankel | Apr. 1, 1947 |
| 2,567,744 | Stanton | Sept. 11, 1951 |